United States Patent
MacGuinness

(10) Patent No.: US 6,237,310 B1
(45) Date of Patent: May 29, 2001

(54) MOVEMENT-RESISTANT HORSE RUG

(75) Inventor: Thomas Peter MacGuinness, Dromiskin (IE)

(73) Assignee: White Horse Holdings Limited, Dundalk (IE)

( * ) Notice: Subject to any disclaimer, the term of this patent is extended or adjusted under 35 U.S.C. 154(b) by 0 days.

(21) Appl. No.: 09/254,022

(22) PCT Filed: Dec. 18, 1996

(86) PCT No.: PCT/IE96/00088

§ 371 Date: Apr. 26, 1999

§ 102(e) Date: Apr. 26, 1999

(87) PCT Pub. No.: WO98/08377

PCT Pub. Date: Mar. 5, 1998

(30) Foreign Application Priority Data

Aug. 29, 1996 (IE) ...................................................... S960608

(51) Int. Cl.⁷ ...................................................... B68C 5/00
(52) U.S. Cl. ...................................................... 54/79.2
(58) Field of Search ...................................... 54/79.1, 79.2, 54/79.3, 79.4

(56) References Cited

U.S. PATENT DOCUMENTS

| | | | | |
|---|---|---|---|---|
| 584,661 | * | 6/1897 | Ayres | 54/79.2 |
| 720,839 | * | 2/1903 | O'Neil | 54/79.2 |
| 725,931 | * | 4/1903 | Cleavef | 54/79.2 |
| 742,285 | * | 10/1903 | Bulles | 54/79.2 |
| 785,021 | * | 3/1905 | Reid et al. | 54/79.2 |
| 1,239,478 | * | 9/1917 | Hanisch | 54/79.2 |
| 1,398,381 | | 11/1921 | Laacke | 54/79.2 |
| 1,500,316 | | 7/1924 | Hamlin | 54/79.2 |
| 1,538,596 | | 5/1925 | Schroedter | 54/79.2 |
| 3,979,886 | | 9/1976 | Johnson et al. | 54/79.2 |
| 5,125,220 | * | 6/1992 | Martin | 54/79.2 |
| 6,009,693 | * | 1/2000 | Hsi-Chang | 54/79.1 |

FOREIGN PATENT DOCUMENTS

| | | |
|---|---|---|
| 535781 | 4/1984 | (AU) . |
| 7810384 | 1/1987 | (DE) . |
| 0595423 | 5/1994 | (EP) . |
| 2570926 | 4/1986 | (FR) . |

\* cited by examiner

*Primary Examiner*—Robert P. Swiatek
(74) *Attorney, Agent, or Firm*—Birch, Stewart, Kolasch & Birch, LLP

(57) ABSTRACT

A horse rug with a front closure for securing the rug to a horse when the opposed front edges of the rug are brought together. The point of closure is positioned, in use, not lower than the point of shoulder of the horse. The rug is provided with strips of webbing on each of its front edges respectively, which form a part of the closure. The strips of webbing define an angle of between 40° and 70° causing the front of the rug to exhibit a collar effect about the neck of the horse. The angle being adapted to accommodate at its interior the point of shoulder of the horse, such that the closure, and thereby the front of the rug, is maintained in position relative to the point of shoulder while the horse undergoes its normal movements. The horse rug is designed so as to accommodate the structure of the shoulder of the horse and thus obviates problems of rubbing and interference with the natural movement of the horse occurring with conventional horse rugs.

8 Claims, 4 Drawing Sheets

MOVEMENT-RESISTANT HORSE RUG

This application is the national phase under 35 U.S.C. §371 of prior PCT International Application No. PCT/IE96/00088 which has an International filing date of Dec. 18, 1996 which designated the United States of America.

TECHNICAL FIELD

This invention relates to a horse rug or blanket, hereinafter referred to collectively as a horse rug or horse rugs, which maintains its position on a horse once it is placed on the horse while the horse undergoes its normal movements.

BACKGROUND ART

The conventional horse rug when applied to a horse is constructed so that the rug engages at or rearwardly of the withers and the closure across the chest of the horse includes one or more (usually two) horizontal straps, with closure means, such as a buckle, as depicted in FIG. 1.

This conventional construction of rug has a number of disadvantages; but the principal disadvantage is that the rug tends to move rearwardly on the horse as the horse moves, causing a tightening of the rug across the shoulders of the horse. The rearward movement occurs as a result of a number of factors, including the inertia of the rug as the horse moves forward and the fact that the direction of growth of the horse's hair assists rearward movement and opposes forward movement (since forward movement would tend to catch the hair). This tightening causes restriction of movement and rubbing of the shoulders, which results in loss of hair and in extreme cases actual cutting of the skin through friction.

Furthermore, this tightening across the shoulders puts a strain on the straps and closure means with consequent wear and tear thereof.

The traditional method of securing the front of horse rugs by means of horizontal straps which buckle generally in the center of the front of the rug interferes with the lowering of the horse's neck. The seriousness of this problem is dependent on the overall size and shape of the horse, but invariably leads to a less than optimal fitting of the rug.

The above problems are particularly pronounced when the horse is outdoors and is in the natural feeding position most of the time.

Accordingly, there is a need for a horse rug which remains in place while accommodating the normal movements of a horse, without the rug tightening across the chest of the horse with the consequent problems. The normal movements of a horse include the movements involved inter alia in eating, drinking, standing, running and rolling.

DISCLOSURE OF INVENTION

The invention provides a horse rug comprising front closure means which can be engaged to secure the rug to a horse when the opposed front edges of the rug are brought together, the point of closure being positioned, in use, no lower than the point of shoulder of the horse, the rug being provided with webbing on each of its front edges, which webbing forms part of said closure means, the webbing defining an angle of between 40° and 70° causing the front of the rug to exhibit a collar effect about the neck of the horse, said angle being adapted to accommodate at its interior the point of shoulder of the horse, such that the closure, and thereby the front of the rug, is maintained in position relative to the point of shoulder while the horse undergoes its normal movements.

By webbing herein is meant also strap or other strip or band and the term is not intended to be confined only to a piece of woven fabric. The term webbing can define generally the sides of an angle or, alternatively, two strips which are positioned so that they are offset with respect to each other but are not joined, but, if extended, they would converge to form an angle.

The term webbing as used herein can also include a patch of material which occupies the area defined by said angle.

Thus, the webbing can be of any suitable material which can achieve the effects hereinabove defined and which can be affixed to or, indeed, integral with the horse rug proper.

The horse rug according to the invention overcomes the problems associated with the conventional horse rug in a number of ways, as hereinafter described.

Because the webbing defines an angle of between 40° and 70°, which is adapted to accommodate at its interior the point of shoulder and thus the structure of the shoulder, the incidence of rubbing and interference with the natural movement of the horse is significantly reduced and one does not observe the loss of hair and cutting of the skin typical of the conventional horse rug.

The configuration of the front closure means and associated webbing arrangement is designed to lift upwards as the horse goes through its normal movements. Thus, the tension created by any backward pull of the rug is allowed to shift forward, thereby loosening the front of the rug. This process of lifting and shifting forward is repeated at regular intervals whenever the horse shakes itself or engages in vigorous activity, such as galloping or bucking.

The position of the rug according to the invention is defined and maintained in relation to the point of shoulder of the horse, and since the point of shoulder is accommodated within the angle of the webbing, the front closure does not drop below or rise above the correct position.

Additionally, the natural movements of the horse tend to continually shift the rug into rather than out of the correct position, since any movement occurring through the shoulder will cause the front closure (and hence the neck of the rug) to be shifted into the most comfortable position for the horse.

Preferably, the webbing consists of two strips which define an angle of approximately 60° therebetween.

Further, preferably, one strip is substantially horizontal, while the other strip follows the groove between the neck and the shoulder of the horse.

By offsetting the two strips in this manner, the strip which follows or is accommodated in the groove between the neck and the shoulder of the horse indirectly raises and spreads the backward tension exerted on the front of the rug, while at the same time keeping the actual closure means at its lowest possible point. Furthermore, by having this strip lying in the groove between the neck and the shoulder, a collar effect is produced which not only raises the centers of tension in the rug in use, but also spreads them over a wider area of the rug. This spreading of the pressure or tension over a wide area of the rug further reduces the incidence of rubbing and interference with the natural movement of the horse. It also reduces the wear and tear on the front closure means and the components thereof.

Preferably, the closure means comprises a hook and ring assembly.

This system of slipping a hook or clip through a ring has the advantages of being quick and convenient to fasten, it is robust and easily maintained and furthermore it is relatively cheap to manufacture.

The particular arrangement of closure means, with its associated webbing arrangement, is designed to be used with a neck design which is substantially straight, namely, without the usual deep cut-out typical of the conventional rug as hereinafter described and illustrated. Thus, the rug can adopt a snug fit about the neck of the horse.

In contrast with the conventional type of rug, the rug according to the invention is positioned, in use, high on the neck of the horse rather than adjacent the withers.

The neck of the horse has a large blood supply. Thus, by covering a large portion of the neck with the rug according to the invention, there is less heat loss. Furthermore, there is less likelihood of ingress of rain at the front of the rug in adverse weather conditions.

The rug can have additional means for securing the rug across the chest of the horse, such as co-operating strips of loops and hooks of the type sold under the Trade Mark VELCRO.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The invention will be further illustrated by the following description of an embodiment thereof, given by way of example only with reference to FIGS. 1–4 of the accompanying drawings.

MODES FOR CARRYING OUT THE INVENTION

Figure 1:
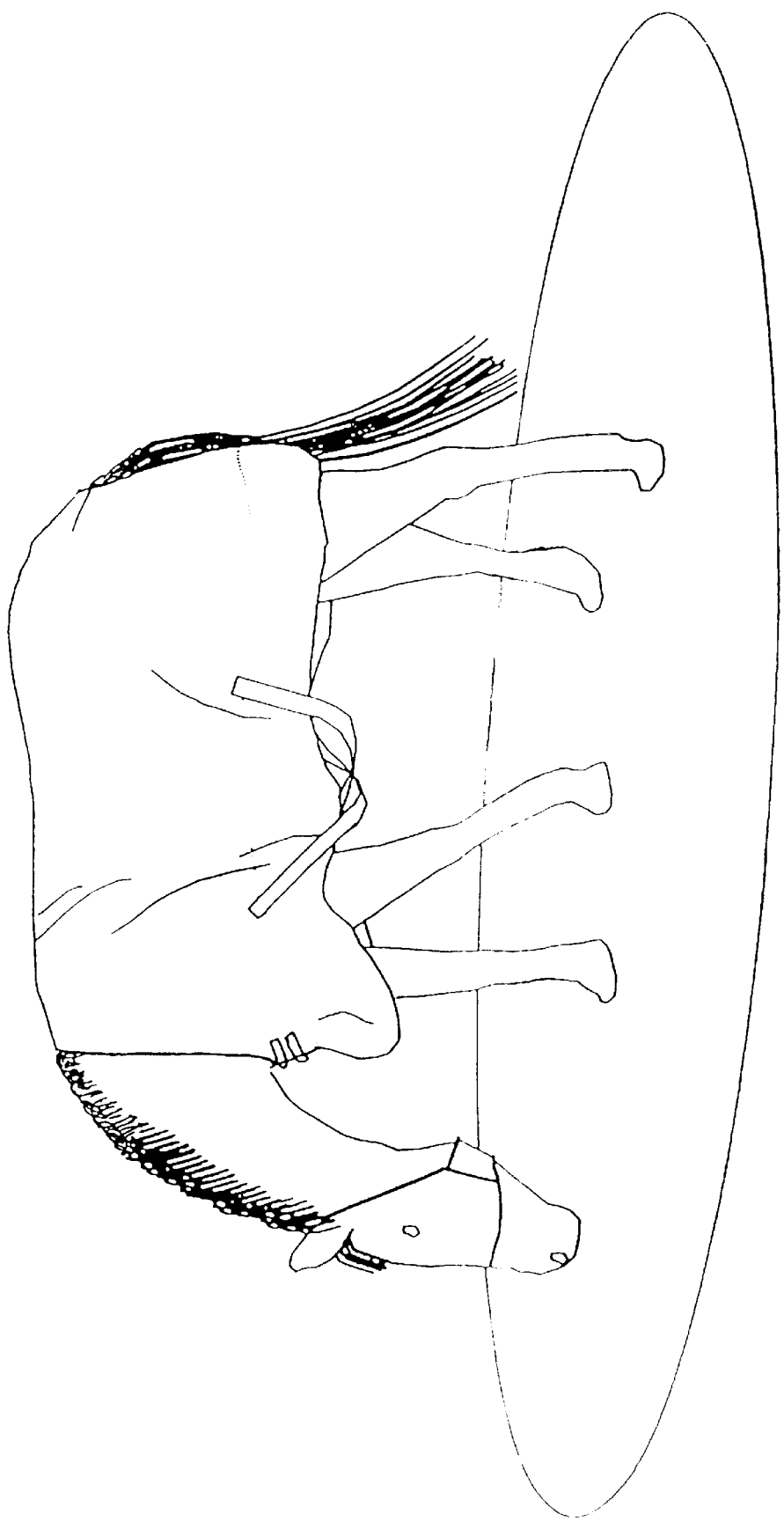
FIG. 1 is a schematic representation of a conventional horse rug showing a closure means comprising a pair of horizontal straps.
Figure 2:
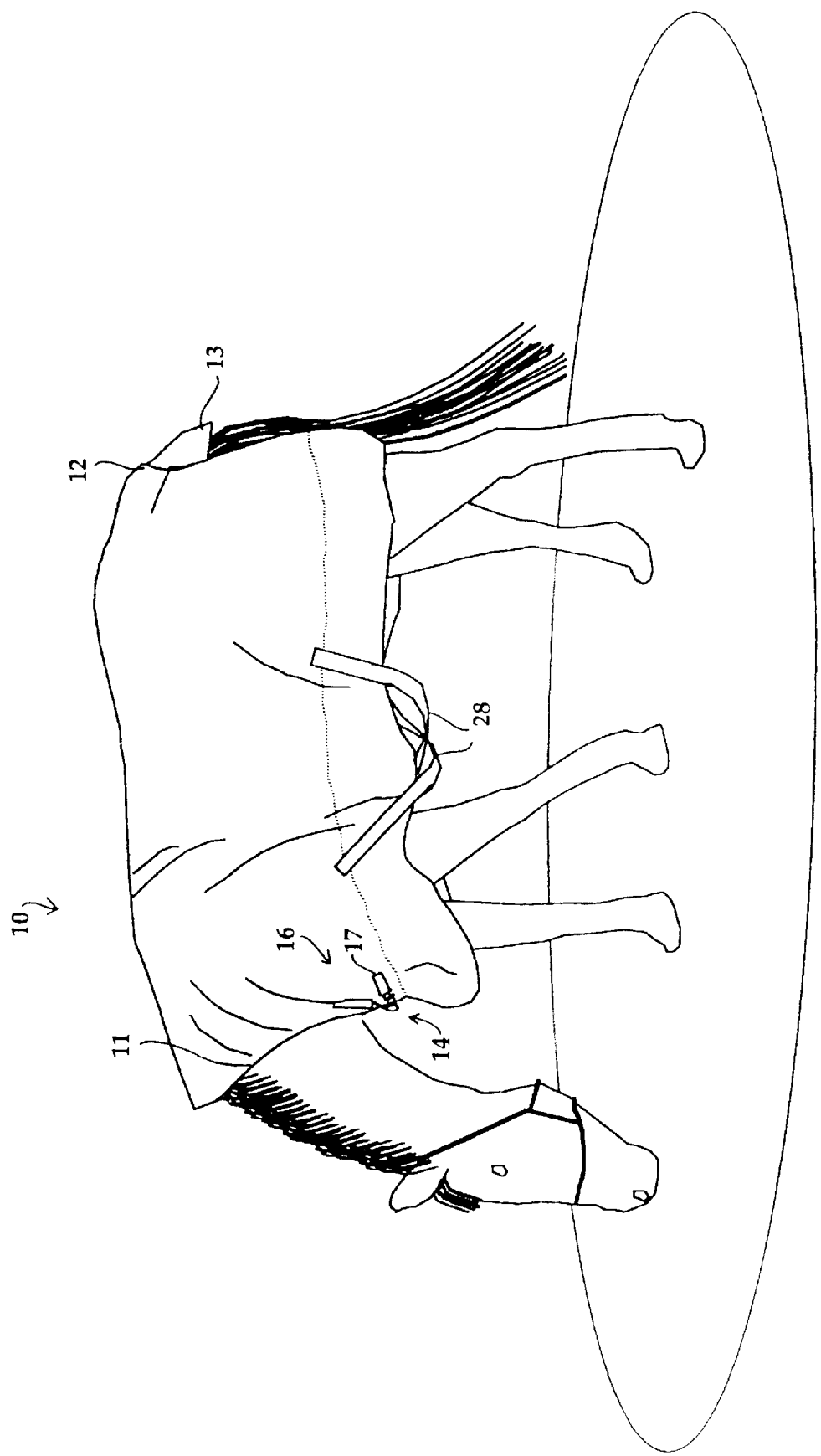
FIG. 2 is a schematic representation of a horse rug according to the invention, in use.
Figure 3:
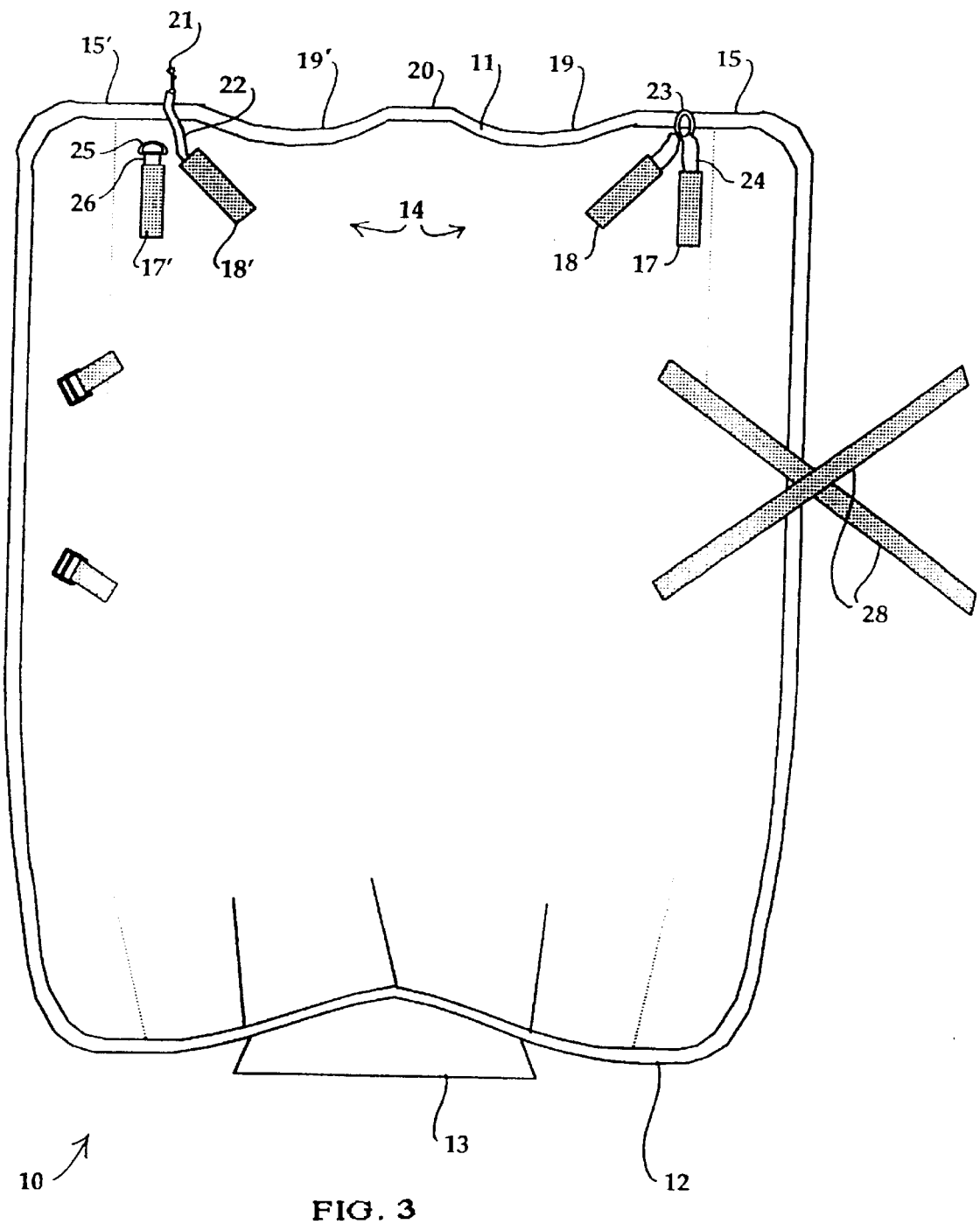
FIG. 3 is a schematic representation of a plan view of the horse rug of FIG. 2.
Figure 4:
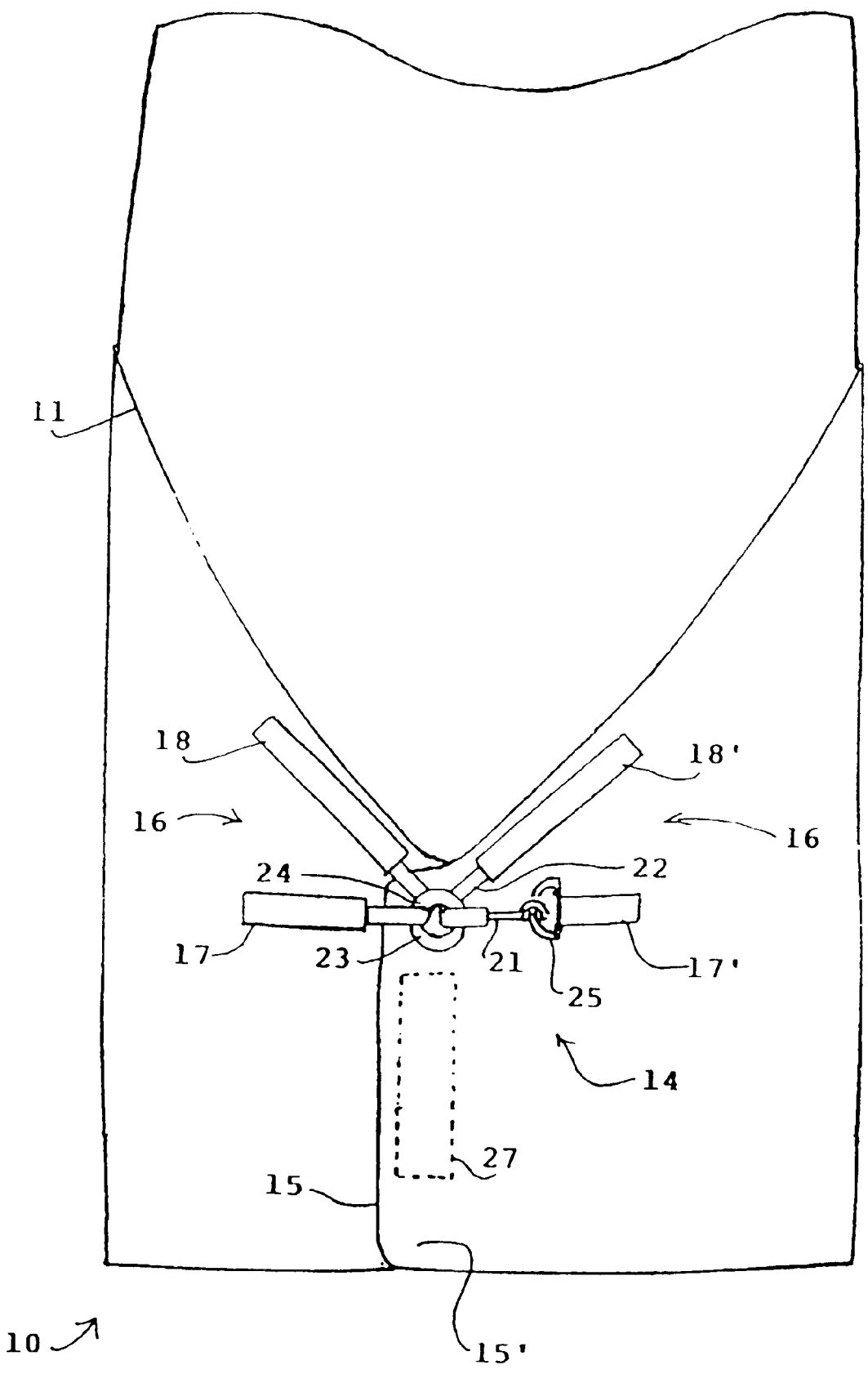
FIG. 4 is a schematic representation of an enlarged detail of the closure means of FIG. 2.

Referring, in particular, to FIGS. 2 and 4 of the drawings, there is illustrated, generally at 10, a horse rug of generally rectangular shape having a neck-engaging portion 11 and a rear portion 12, including a tail flap 13. The rug 10 has a front closure means (best shown in FIG. 3), indicated generally at 14, which can be engaged to secure the rug to the horse when the opposed front edges 15,15' of the rug are brought together, so that the point of closure is positioned, in use, no lower than the point of shoulder of the horse corresponding generally to reference numeral 16.

The rug 10 is provided with strips of webbing 17,17' and 18,18' on each of its front edges 15, 15', respectively, these strips forming part of the closure means 14. Strips 17,18 and 17',18', respectively are positioned at an angle of 60° relative to each other and each pair of strips 17,18 and 17',18' is adapted to accommodate at its interior the point of shoulder 16 of the horse, so that any rearward movement of the rug 10 is resisted, while at the same time the strips 18 and 18' give rise to a collar effect and provide an opposing force to the normal rearward force on the rug 10, such that the rug remains in place about the neck of the horse, while the horse goes about its normal movements.

When the point of shoulder 16 of the horse moves, the webbing strips 17,17',18,18' accommodating the point of shoulder 16 are likewise moved. This movement causes the "collar" formed at the neck-engaging portion 11 of the rug to move in consequence, ensuring that this "collar" remains correctly in position about the neck of the horse.

The strips 17,17' are positioned so that they are substantially horizontal, whereas the strips 18,18' follow the groove between the neck and shoulder of the horse.

The neck-engaging portion 11 is defined by two small cut-outs 19,19' connected by a straight piece 20. This arrangement of the neck-engaging portion 11 means that the rug 10 can be snug fit about the horse's neck.

The closure means 14 includes a hook and ring assembly. The hook 21 is typically made of metal and is attached to one end of the strip 18' by means of a connecting piece 22. In use, to close the rug 10 across the chest of the horse, the hook 21 is passed through ring 23 which is mounted on a connecting piece 24 which bridges strips 17 and 18 and then engages a "D" ring 25 mounted on one end 26 of strip 17'.

The edges 15,15' are additionally secured by strips of VELCRO 27 (shown in dotted outline in FIG. 4), if required.

The rug 10 also has conventional girth or surcingle straps 28.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A horse rug comprising a front edge which is substantially straight, front closures which are engageable to secure the rug to a horse when opposed sections of the front edge of the rug are brought together, the front closures including at least two angled strips of webbing on each of the opposed sections of the rug, neither strip forming part of the front edge of the rug, the strips being engageable at a point to close the rug, the webbing causing the front of the rug to form a collar about a neck of a horse and the rug being maintained in position while a horse undergoes its normal movements.

2. The horse rug according to claim 1, wherein a pair of strips on at least one of the opposed front edges of the rug has an angle of between 40°0 and 70° defined therebetween.

3. The horse rug according to claim 2, wherein the angle between the at least one pair of strips is approximately 60°.

4. The horse rug according to claim 2, wherein a pair of strips on both opposed front edges of the rug have the angles of between 40° and 70°0 defined therebetween.

5. The horse rug according to claim 1, wherein one of the at least two strips is substantially horizontal and another of the at least two strips follows a groove between a neck and shoulder of the horse when the rug is in use upon the horse.

6. The horse rug according to claim 1, wherein the closure further comprises a hook and ring assembly.

7. The horse rug according to claim 1, wherein means are provided for securing the rug across the chest of the horse in use.

8. The horse rug according to claim 1, wherein an angle is formed between a pair of strips on each of the opposed front edges of the rug, the angle being adapted to accommodate at its interior a point of shoulder of a horse.

* * * * *